US009197925B2

(12) United States Patent
Alberth et al.

(10) Patent No.: US 9,197,925 B2
(45) Date of Patent: Nov. 24, 2015

(54) POPULATING A USER INTERFACE DISPLAY WITH INFORMATION

(75) Inventors: William P. Alberth, Prairie Grove, IL (US); Geoffrey S. Roman, New Hope, PA (US); Dean E. Thorson, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 277 days.

(21) Appl. No.: 13/324,525

(22) Filed: Dec. 13, 2011

(65) Prior Publication Data
US 2013/0152129 A1 Jun. 13, 2013

(51) Int. Cl.
H04N 21/431 (2011.01)
H04N 21/442 (2011.01)
H04N 21/45 (2011.01)
H04N 21/482 (2011.01)

(52) U.S. Cl.
CPC ..... *H04N 21/4312* (2013.01); *H04N 21/44218* (2013.01); *H04N 21/4532* (2013.01); *H04N 21/482* (2013.01); *G06F 2203/04802* (2013.01)

(58) Field of Classification Search
USPC .......................................................... 725/41
See application file for complete search history.

(56) References Cited

U.S. PATENT DOCUMENTS

| 7,373,650 | B1 | 5/2008 | Rodriguez et al. | |
| 7,712,117 | B1 | 5/2010 | Mohr | |
| 2002/0075311 | A1 | 6/2002 | Orbanes | |
| 2002/0083034 | A1 | 6/2002 | Orbanes | |
| 2002/0085035 | A1 | 7/2002 | Orbanes | |
| 2002/0089550 | A1 | 7/2002 | Orbanes | |
| 2002/0105537 | A1 | 8/2002 | Orbanes | |
| 2002/0109680 | A1 | 8/2002 | Orbanes | |
| 2004/0140995 | A1* | 7/2004 | Goldthwaite et al. | 345/716 |
| 2005/0097603 | A1 | 5/2005 | Kikinis | |
| 2008/0134086 | A1* | 6/2008 | Liao et al. | 715/810 |
| 2009/0199230 | A1* | 8/2009 | Kumar et al. | 725/32 |
| 2009/0320073 | A1* | 12/2009 | Reisman | 725/51 |
| 2010/0031286 | A1* | 2/2010 | Gupta et al. | 725/38 |
| 2010/0073565 | A1 | 3/2010 | Hwang et al. | |
| 2010/0201790 | A1* | 8/2010 | Son et al. | 348/53 |
| 2011/0061075 | A1* | 3/2011 | Lee | 725/46 |
| 2011/0161998 | A1 | 6/2011 | Alberth et al. | |
| 2011/0267439 | A1 | 11/2011 | Chen et al. | |
| 2012/0054797 | A1 | 3/2012 | Skog et al. | |

OTHER PUBLICATIONS

Patent Cooperation Treaty, "PCT Search Report and Written Opinion of the International Searching Authority" for International Application No. PCT/US2012/069044 dated Mar. 19, 2013, 12 pages.

(Continued)

*Primary Examiner* — Jefferey Harold
*Assistant Examiner* — Justin Sanders
(74) *Attorney, Agent, or Firm* — Lowenstein Sandler LLP

(57) ABSTRACT

A method of populating a series of tiles of an interactive user interface with information is disclosed. The interactive user interface is in a form of a visual display of a representation of an object having a surface contour, and the method includes the step of populating the tiles such that information of greater priority is initially populated in tiles that are most prominently displayed on the object and information of lesser priority is initially populated in tiles that are less prominently displayed on the object. Apparatus and a computer readable storage medium for performing the method are also disclosed.

24 Claims, 6 Drawing Sheets

(56) References Cited

OTHER PUBLICATIONS

NAGRA, "NAGRA Media Cable: Solutions Guide", 4 page brochure, Apr. 2011.
"ABC News for iPad for iPad on the iTunes App Store", available at itunes.apple.com/us/app/abc-news-for-ipad/id380520716?mt=8, retrieved Aug. 31, 2011, dated Jan. 22, 2011.
Sarah Perez, "More Touchscreen Innovation: ABC News for iPad Launches", ReadWriteWeb, available at www.readwriteweb.com/archives/more_touchscreen_innovation_abc_news_for_ipad_launches.php, retrieved Aug. 31, 2011, dated Jul. 22, 2010.
Geoff Daily, "One of the Coolest Flickr Visualizations Around", App-Rising.com, available at app-rising.com/2008105/one_of_the_coolest_flickr_visu.html, retrieved Aug. 31, 2011, dated May 15, 2008.
David Dahlquist, "ABC News for iPad features innovative interface", Macworld.com, available at www.macworld.com/article/152853/2010/07/abc_news_ipad.html, retrieved Aug. 31, 2011, dated Jul. 21, 2010.
Terry Smith, "Website of the day: Tag Galaxy", WebBeat.tv, available at webbeat.tv/website-of-the-day-tag-galaxy/, retrieved Aug. 31, 2011, dated Jun. 27, 2011.
Pioneer Europe, "Free download: rediscover your tunes with MusicSphere", available at www.pioneer.eu/eur/content/press/news/musicsphere.html, retrieved Aug. 31, 2011, dated May 6, 2010.
International Search Report and Written Opinion dated Jun. 17, 2014 for PCT/US2012/069044.

* cited by examiner

POPULATING A USER INTERFACE DISPLAY WITH INFORMATION

BACKGROUND

User interface displays may present a menu or listing of various items of information to a user for purposes of permitting the user to interactively view the listings and/or select one of the displayed items or options from the listing. Such user interface displays are useful in many applications. One example of such display is an electronic channel guide which provides various information concerning channels and content available on the channels or on-demand to a subscriber of a cable TV operator, satellite TV operator, Internet broadcaster/service provider or other program provider.

An electronic channel guide is typically displayed on a display monitor or screen of a television, a tablet, lap-top or other computer, a smart phone, a remote control unit, a media center device, or other electronic device associated with a monitor or screen. The electronic channel guide typically displays a listing of channels or programs on demand carried by the service provider and information concerning the content of each channel with respect to a particular day and time of day.

Conventional user interface displays are provided in a tabular format with each item of information being provided on a separate line or row of the listing. Typically, where the information or selections are numerous, the tabular listing is provided in a scrollable format such that only a fraction of a total number of selections is actually displayed at any given time. This requires the user to scroll up or down (vertically) through rows or lines of the tabular listing to display items in the listing. Channel guide displays, as one example, also typically permit scrolling horizontally along lines or rows of the tabular listing for purposes of displaying additional information and content relative to days and/or times.

As a slight variation on the tabular format discussed above, each row of a listing within a user interface display may provide information with respect to multiple different items in a grid-like pattern. It is also known to provide so-called thumbnail illustrations, icons, or images next to or as an item within a listing. Still further, it is also known to map or cause such a listing of information to wrap onto the skin of a displayed object shown in perspective view such that the listing follows the surface contour of the object shown in perspective. By way of example, a listing of information can be mapped onto the "skin" or outer surface contour of a sphere or globe, as provided, for instance, in the ABC News App for iPad computer application for providing an interactive globe interface that displays still images and headlines of news stories accessible via the Internet or like network connection.

In the above referenced example, the user interface is provided in the form of a perspective representation of a globe for display on a flat or two-dimensional display screen. A plurality of individual tiles forms the skin or outer contour of the globe in a patch-like format with each tile representing one item of content selectable from a listing of a plurality of content selections. The tiles are arranged in a plurality of rows with each row extending laterally across the surface contour of the globe with the tiles in any given row being arranged in single-file order. The laterally-extending rows are stacked vertically from south to north poles of the globe such that several rows are in the line of sight of the viewer.

Due to the perspective nature of the representation of the above referenced globe, the tiles in the rows become smaller, more distorted, and therefore less prominent as they extend farther from the equator of the globe and closer to the north and south poles of the globe and as they extend around the outer peripheral edges of the surface contour of the globe relative to the line of sight of the viewer. The user is able to interactively scroll through the listings by causing the globe to spin in any direction so that any tile within any row can be re-located and displayed in a prominent position, such as in a front-center position on the globe relative to the line of sight of the viewer. At this position, the tile appears relatively large and its content is relatively easy to view and/or read by the user. The user may also change the perspective of the globe moving the globe further away to see more of the globe, and moving closer to the globe to see more details on individual tiles. By moving the reference perspective into the globe the user can see the globe and tiles from a point within the sphere. The user is able to interactively select any one of the tiles to view the content represented thereby.

With respect to some user interface displays, a relatively large number of items to be represented may eliminate the practical use of wrapping or mapping the listing about a surface contour of an object shown in perspective view in a visual display. For instance, the number of channels or content provided by a cable TV, satellite TV, Internet service provider, or other service provider may be too numerous to display in a crowded field of tiles of sufficient size to be readily perceptible to an end user in a manner enabling channels and content to be readily, quickly and conveniently located within the interactive display. Thus, an apparatus and method facilitating alternatives with respect to displaying user interface information, such as electronic channel and program guides, are desired.

SUMMARY

This disclosure describes a method of populating a series of tiles of an interactive user interface with information with a signal processing electronic device. The interactive user interface is in a form of a visual display of a representation of an object having a surface contour, and the method includes the step of populating the tiles such that information of greater priority is initially populated in tiles that are most prominently displayed on the object and information of lesser priority is initially populated in tiles that are less prominently displayed on the object.

This disclosure further describes a method of populating an interactive user interface of an electronic channel guide. The identity of each user consuming content from a display is determined, and the interactive user interface is formatted in a form of a visual display of a surface in three-dimensions having an outer surface contour defined by a series of tiles. The series of tiles include prominently displayed tiles and less prominently displayed tiles such that the prominently displayed tiles are larger and less distorted than the less prominently displayed tiles. A plurality of channels to be displayed on the series of tiles is sorted from channels of greater interest to the user or users to channels of lesser interest to the user or users. The method further includes the step of populating the series of tiles such that the channels of greater interest are automatically populated into the prominently displayed tiles and the channels of lesser interest are automatically populated in the less prominently displayed tiles.

This disclosure also describes a signal processing electronic device for populating a display of an interactive user interface with information. The device includes at least one processing unit configured to format the interactive user interface in a form of a visual display of a three dimensional object having an outer surface contour defined by a series of tiles. The series of tiles include prominently displayed tiles and less prominently displayed tiles, and the prominently displayed tiles are larger and less distorted than the less prominently displayed tiles. The at least one processing unit also being configured to sort a plurality of items of information to be displayed by distinguishing between items of information of greater interest to an identified one or more users and items of information of lesser interest to the identified one or more users and to arrange the series of tiles in an initial visual display such that the items of information of greater interest are automatically populated into the prominently displayed tiles and items of information of lesser interest are automatically populated in the less prominently displayed tiles.

In addition, this disclosure describes at least one non-transitory computer readable storage medium having computer program instructions stored thereon that, when executed by at least one processor, cause the at least one processor to perform operations including populating a series of tiles of an interactive user interface with information. The series of tiles forming the interactive user interface being in a form of a visual display of a representation of an object having an outer surface contour defined by the series of tiles, and the operation of populating the tiles being performed such that information of greater priority is initially populated in tiles that are most prominently displayed on the object and information of lesser priority is initially populated in tiles that are less prominently displayed on the object.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Apparatus and method for populating a display with information such as a listing of content, selections, options, or other information for display to a user are described, and more particularly, apparatus and method for populating a user interface display with information to be displayed in a form mapped across the contour of a perspective or three-dimensional (3D) representation of an object within the display are described.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
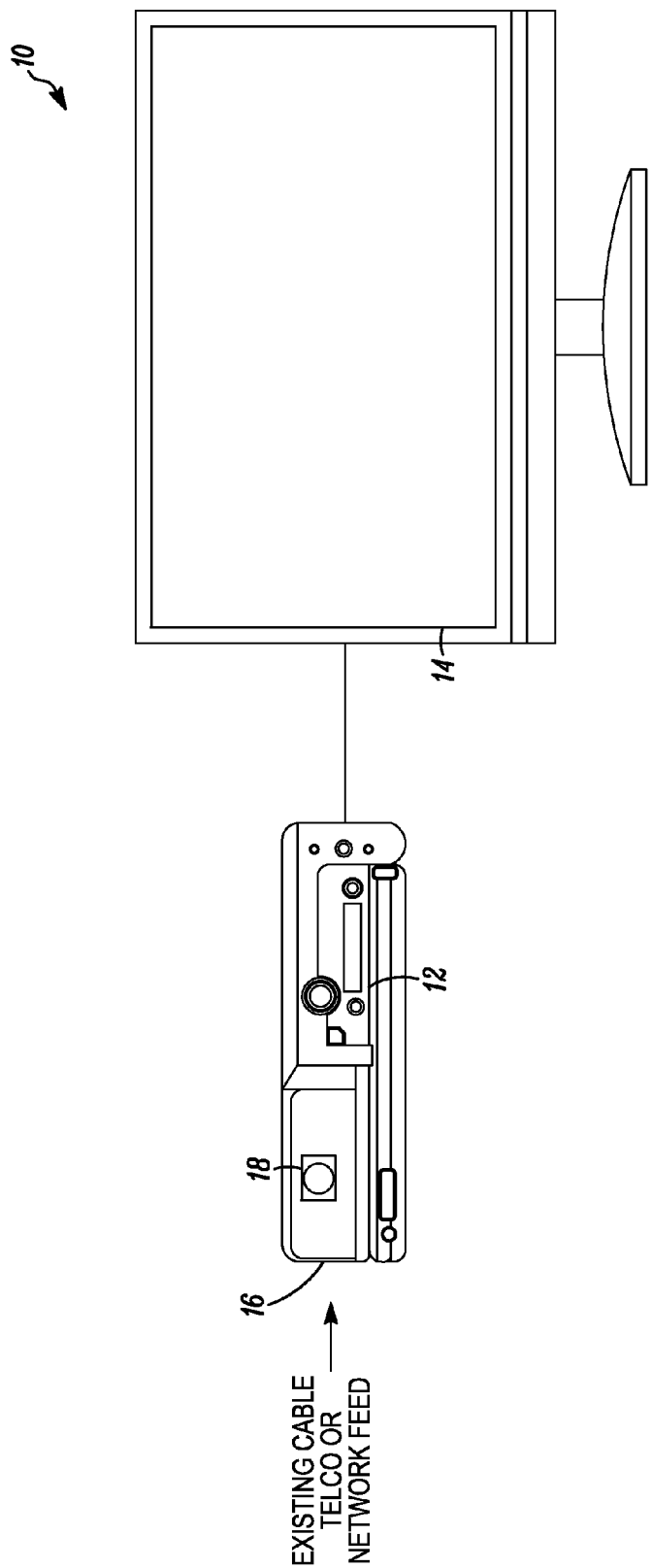
FIG. 1 is a schematic view of an arrangement of an electronic device, such as a set top box, interconnected to a display monitor according to an embodiment.

A relatively simple arrangement 10 of a consumer electronic device 12, such as a set top box (STB), interconnected to a display monitor 14, such as a high definition flat screen television, is shown in FIG. 1. In the arrangement 10, the STB 12 has an input 16, such as an RF input, connected via a cable or the like to a service provider network such as a network of a cable or satellite subscription television program provider. The television 14 can have capabilities for displaying content in three-dimensions (3D) (see FIG. 2) or provide a traditional two-dimensional display (2D) (see FIG. 3). Also, as a possible option, the STB 12 can include or can be coupled (e.g., by a wired or wireless connection) to a camera 18 for use in determining the identity of viewers present. In some embodiments, camera 18 can comprise one or more devices for 3D imaging, such as a plurality of optical imaging sensors and/or a motion sensing input device.

The arrangement 10 of FIG. 1 is provided merely for purposes of example of electronic devices which may utilize a user interface display, such as an electronic channel guide or an electronic program guide. The above referenced arrangement may include many different types and forms of consumer electronic devices. For example, the arrangement can include digital video recorders (DVRs), gaming consoles, consumer devices providing Internet connectivity, consumer devices providing connectivity to other networks such as local networks, personal video recorders and players or any other type of program recorder or player, personal computers, tablet computers, laptop or notebook computers, media centers, smart phones, remote control devices, and the like. Also, many of the above referenced consumer devices can also be combined and embodied in a single, integral consumer device providing multiple different functions. For instance, the STB 12 in FIG. 1 may be manufactured integral with monitor 14 and/or a DVR.

As part of a service provided by a service provider to an end user subscriber, an electronic channel or program guide may be provided for display on the monitor 14. As discussed above, the monitor 14 may be a conventional 2D display monitor or a 3D display monitor. In either case, the channel or program guide can be shown in the form of a plurality of separate tiles mapped to or wrapped about an outer contour of an object shown in perspective view on a 2D display (see FIG. 3) or shown in 3D on a 3D display (see FIG. 2).

Figure 2:
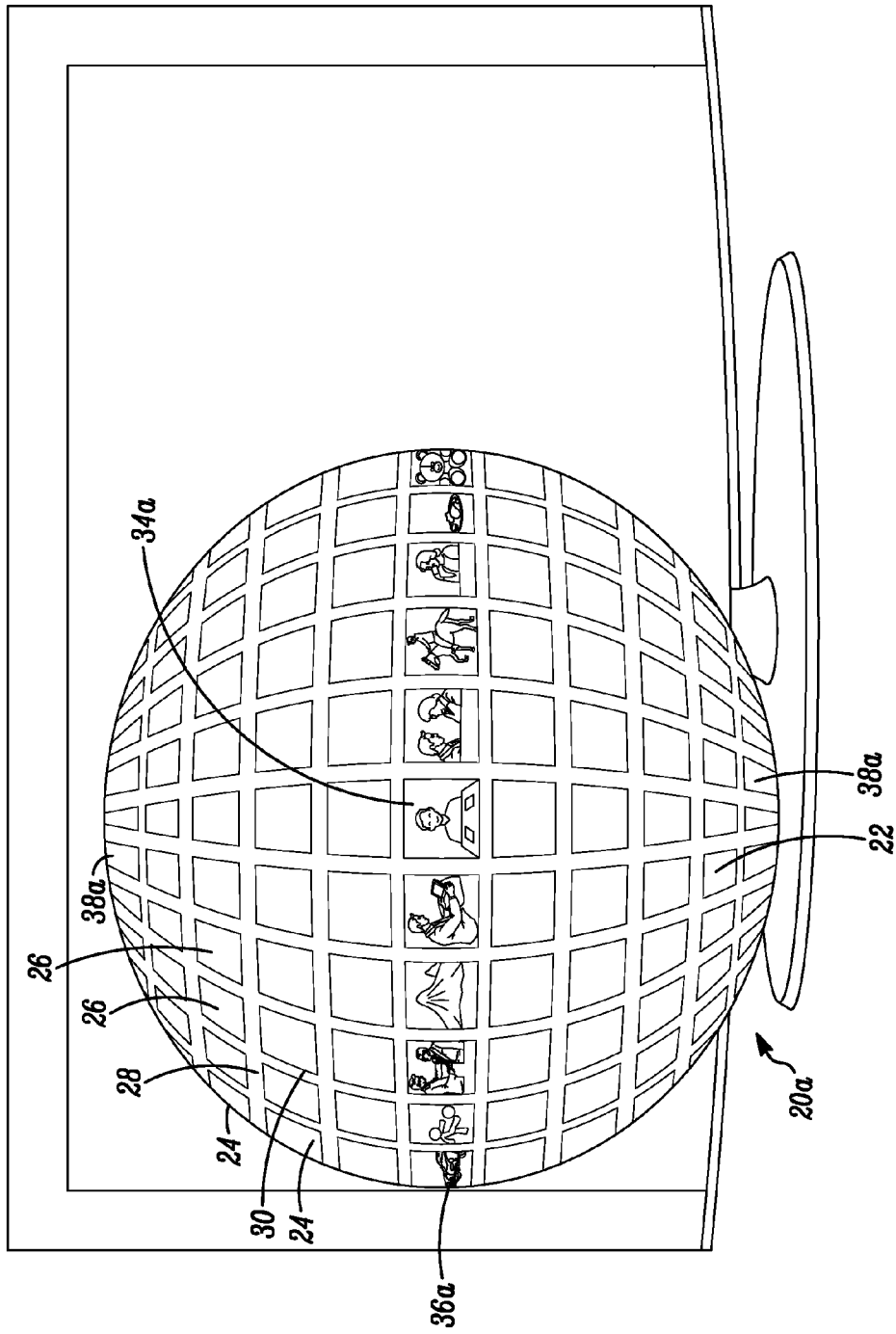
FIG. 2 is a view of an interactive user interface display provided in the form of a sphere on a three-dimensional display according to an embodiment.
Figure 3:
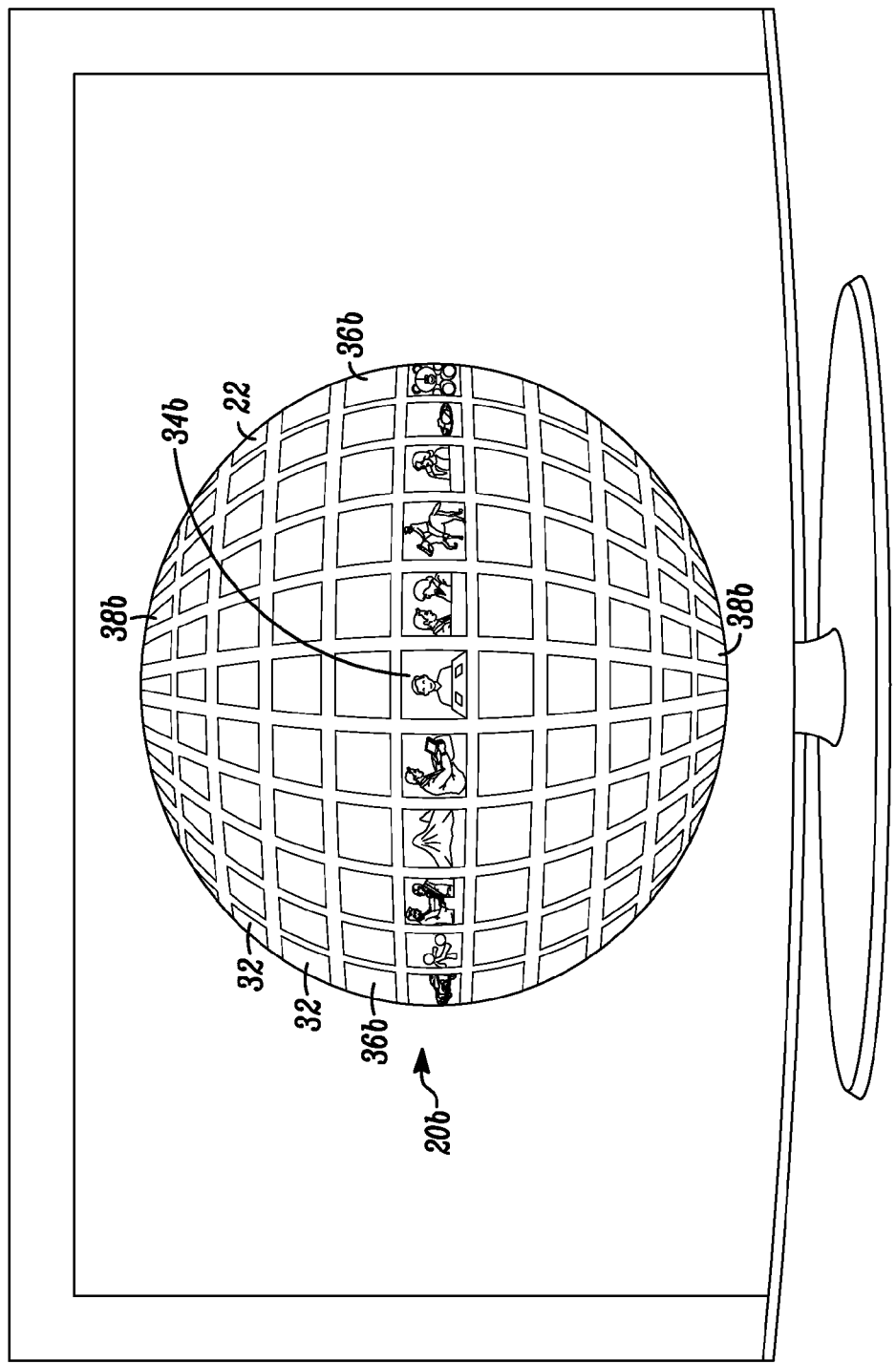
FIG. 3 is a view of an interactive user interface display provided in the form of a sphere on a two-dimensional display according to an embodiment.

The object selected for providing a surface contour onto which the tiles extend can be of various forms. Solely for ease of explanation and illustration, the object discussed herein and shown in FIGS. 2 and 3 is a sphere or globe. However, it should be understood that the object could have any shape; for example, any surface in three dimensions. A few illustrative examples include the shape of an egg, an apple, a multi-paneled orb, a cylinder, a cube, or any other shape capable of being shown in perspective or 3D with the surface contour thereof covered with a series of tiles. Also, although a channel guide is disclosed herein with respect to an example of a user interface display, this disclosure is not limited to such use and is applicable to any type of interactive user interface providing a listing of information or content mapped about the surface contour of a displayed object. In some embodiments, an electronic channel guide (as used herein) can be or can comprise an electronic program guide (EPG), e.g., a guide to programs or content items which may or may not be organized on the basis of channels used in connection with delivery of the programs or content items.

The sphere 20a shown in 3D in FIG. 2 and the sphere 20b shown in perspective in FIG. 3 each includes a plurality of separate tiles 22 displayed on the surface contour of the spheres. The tiles 22 can be arranged in a grid-like array including a plurality of rows 24 of tiles with or without a plurality of definable columns 26 of tiles. For instance, the sphere 20a in FIG. 2 includes an ordered array of lines that separate the tiles and that form lines 28 of latitude and lines 30 of longitude. FIG. 3 also shows tiles 22 arranged in rows 32. As an alternative to the illustrated embodiments, the tiles 22 can be arranged in rows such that the tiles in adjacent rows are not uniformly aligned in definable columns. Each of the spheres 20a and 20b also inherently include an equator and pair of opposite upper and lower poles (i.e. north and south poles). Of course, the tiles 22 may be arranged differently than as illustrated in the embodiments of FIGS. 2 and 3. For example, the number and shape of tiles in each row can vary and the relative size of the tiles in different rows may be different. In some embodiments, some or all of the tiles may be displayed as touching each other; for example, some or all of the lines 28, 30 may have no thickness, or may be hidden or imperceptible to a viewer.

Some tiles in the spheres 20a and 20b are located in prominently displayed positions such that the content displayed within the tile or tiles are of the largest size, are less distorted as seen by the viewer, and are thus the easiest for a viewer to read and/or view. By way of example, the tiles 34a and 34b are located in the front center of each of the spheres 20a and 20b on, near, along or adjacent the equator and define the most prominently displayed position for a tile. However, as various ones of the tiles are positioned laterally away from the front center position along the equator, the tiles gradually become smaller due to the perspective nature and contour of the sphere and are therefore more difficult to view. Thus, the tiles 36a and 36b located at the periphery of the sphere are displayed less prominently as compared to the front center position, 34a and 34b. In addition, as the rows extend toward the opposite upper and lower poles of the spheres 20a and 20b, the size and prominence of the tiles progressively lessen and become more difficult to read and/or view. The tiles 38a and 38b located adjacent the opposite poles are not clearly viewable (i.e., small and distorted) and thus are the least prominently displayed position for tiles appearing in the display.

In addition to the tiles displayed on the spheres, there may or may not be additional tiles hidden from view (for instance, if tiles continue about the rear, non-viewable, side of the spheres). Of course, the end user is able to provide inputs (e.g., gestural inputs, touchscreen inputs, mouse or touchpad inputs, keyboard inputs, and the like) to spin, rotate or otherwise manipulate the spheres, including the rows and/or columns of the spheres as initially presented, to cause any one of the tiles to be located in or near the front-center (i.e., most prominent) display position.

As discussed previously, when a display includes a large number of tiles, information of particular interest to an end user may become lost or hard to find within a crowded field of a large number of relatively small-size tiles. For example, an item of information of most interest to a particular end user may initially be populated within a tile located on the rear (non-visible) side of a sphere or may be positioned close to the poles of the sphere. Thus, according to an embodiment disclosed herein, a method for automatically populating tiles of an interactive user interface display is provided such that the information of particular interest to a known end user or users is at least initially populated in tiles in prominently displayed positions.

By way of example and not be way of limitation, information of most interest to a particular end user or users may be positioned and arranged (i.e., populated into a tile) in the interactive user interface displays of FIGS. 2 and 3 in the front-center position, 34a and 34b, which provides the most prominent position of each of the spheres 20a and 20b. Other information of significance to the particular user or users is positioned adjacent the front-center position and/or within the same row as the front-center position along the equator and/or in an adjacent row close to the equator of the sphere. Information of progressively less interest to a particular user may be positioned further away from the front-center position, and information of little or no interest to the particular user may be positioned adjacent the poles, on the rear non-viewable side of the sphere, or not populated into a tile within the display.

In a multi-user environment, information of most interest of all current or present users or viewers is considered when generating the user interface display. For example, in the case of a husband and wife, the user interface displays that would be generated for each individually may be different than a user interface display generated when both are present and considered as a group. In such a multi-user environment, an aggregation of preferences of information may be displayed as discussed above with information of most interest to the group as a whole in prominently displayed tiles. As another alternative, the preferences of each member forming the group may be located on different parts of the display. As one example, information of most interest to each user may be displayed in physical locations on the display that are physically or visually closest to the actual location of each user (for example, on the right side and left side of the display), with information of lesser interest to the users moved to less prominent positions.

Figure 4:
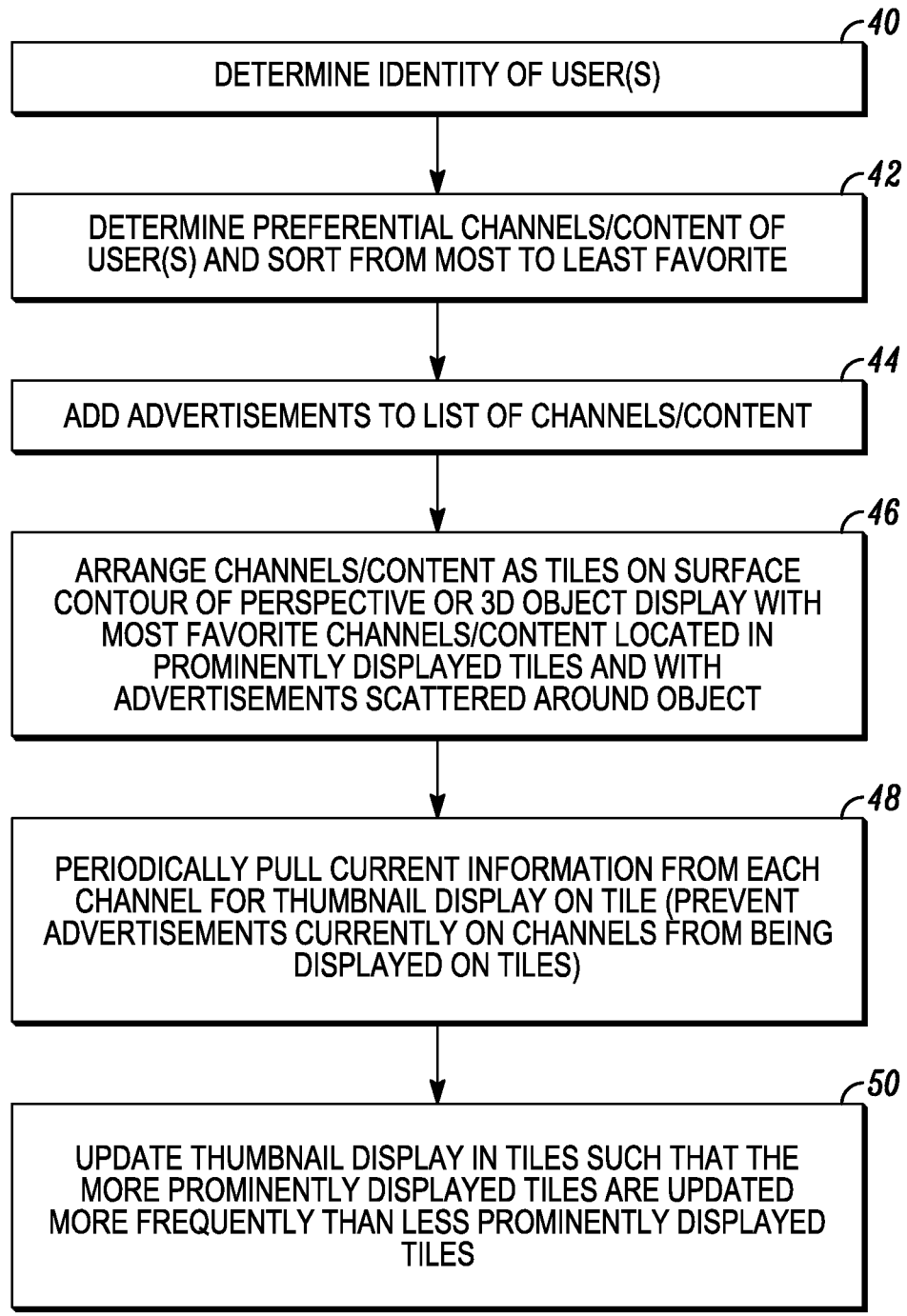
FIG. 4 is a block diagram of process steps of a method for populating the tiles of an interactive user interface display according to an embodiment.

FIG. 4 provides an example of the steps of a method for populating the tiles of an interactive user interface display with respect to an electronic channel guide that may be provided, for instance, by the arrangement 10 shown in FIG. 1. In this embodiment, one or more tiles of the sphere or other object shown in perspective or 3D in the display may represent a particular channel provided by the service provider and the content provided on the channel on a given day and time of day. In further embodiments, one or more tiles may represent a particular program or content item (e.g., video on demand) provided by one or more service providers. In addition, one or more tiles also may be provided with respect to content stored locally on a DVR which may form part of the arrangement 10. Still further, one or more tiles, which in some embodiments may be scattered throughout the user interface display, may represent advertisements (e.g., text advertisements, images, video, etc.) provided by one or more service providers.

The initial presentation and positioning of the tiles in the user interface display or sphere is dependent upon the specific end user or end users. For example, the identity of the end user or users is first determined See step 40 in FIG. 4. For instance, a user or users may manually enter their identity when prompted, for instance, with the use of a remote control unit or the like. Alternatively, the identity of the user may be automatically determined, for example, based on stored information in a memory of the STB 12, or based on a setting provided in a remote control unit, or based on a communication with a smart phone or other portable electronic consumer device possessed by the user and communicating with the STB 12. As a further alternative, the STB 12 or other device may include a camera 18 and may automatically identify the viewer or viewers, e.g., based on facial recognition technology and/or motion sensing technology for 3D mapping such as body or face mapping. In this case, as a new viewer enters the room, the new viewer can be identified and such identification may alter how tiles in a user interface display are populated with channels/content. As another alternative, Near Field Communications (NFC) may be used between items located on the user or users and the STB 12 to determine the identity of each user.

Depending on the particular user or users identified in step 40, the STB 12 or other device determines the list of channels, other content, and/or types of advertisements preferred by or directed to the user or users. The channels or content favored by the end user may be pre-set by the end user as part of a set-up operation or it may be based on data collected of actual past viewings of the channel and content by the end user. The list of available and favorite channels and other content preferred by the user or users are automatically sorted from most favorite to least favorite. See step 42 in FIG. 4.

Advertisements that may be directed to the user or users are added to the list of channels and other content. See step 44 in FIG. 4. The advertisements for inclusion in tiles in the display may be selected based on the types of channels or content favored by the end user or the sex, age, and/or particular interests of the end user.

The channels and other content that are considered the most favorite by or of greatest interest to the user or users are positioned in the most prominent display positions on the user interface channel guide display. See step 46 in FIG. 4. For instance, the most favored content may be positioned within, adjacent or closely located to the front-center positions 34*a* and 34*b* of the spheres 20*a* and 20*b* where the information displayed by the tiles are most easily viewed by the end user or users. Channels or content that are considered less favorite are located in less prominent display positions, for example, near the opposite poles of the sphere. Advertisements that may be of interest to the end user or users are interspersed throughout the tile locations on the sphere such that the advertisements are scattered throughout the sphere.

In some instances, it may be desirable or necessary to limit the number of items for display on the surface contour of the sphere or other object. For example, with respect to an electronic channel guide of a service provider, a channel that is not available to a particular end user subscriber may be prevented from being displayed on the sphere or other object. Thus, only the channels and other content to which an end user is actually subscribed to receive and able to receive would be considered for display, not the total number of channels that a service provider may be capable of providing. Also, some channels determined to be of little interest to the end user may not be included in the display. For instance, an end user during a set up procedure may pre-identify certain channels that are not to be included in a display.

A thumbnail image can be provided for display in each tile and can be a still image or moving image (e.g., motion picture video) corresponding to content currently available or available at a selected day and time of day, e.g., on the particular channel. For instance, the still image or motion picture video may be an image of a star character, or one or more scenes selected, clipped, or sampled from a particular show, movie or other content.

The thumbnail image may also be a 3D video or a 3D still image. Thus, the thumbnail itself can be shown in 3D (still image or video). For example, in an embodiment, a 3D video or 3D still image is displayed within a space, at least one boundary of which is defined by a boundary of the tile. In further illustrative examples of such an embodiment, the tile could be viewed as a window looking into the 3D space of the thumbnail video or image, or the tile could be viewed as a backdrop of the 3D space of the thumbnail video or image, or the tile could intersect a plane of the 3D space of the thumbnail video or still image.

The thumbnail video or still image, whether in 3D or otherwise, may represent a sampled image currently being played or recently shown on the channel to which the tile corresponds. However, in an embodiment, the image shown in the interactive user display is limited to an image of the primary show or content identified by the tile and not of an advertisement or other secondary content that may be currently playing on the channel when the channel is sampled for obtaining the thumbnail image.

In some embodiments, no audio is associated with the thumbnail video or image; in other embodiments, associated audio may be available for the thumbnail video or image, and in further embodiments, the associated audio may be played when the tile displaying the thumbnail video or image is, for example, selected, focused upon, highlighted, traversed by a pointer, or the like. In further embodiments, the thumbnail image may be displayed as a moving image or video at times when the tile displaying the thumbnail image is, for example, selected, focused upon, highlighted, traversed by a pointer, or the like, and may be displayed as a still image at other times.

Information for each channel or content may be periodically pulled (i.e., sampled) from the signals carrying the channels so that the thumbnail images in the channel guide display correspond to the content currently or recently played on the channel. See step 48 in FIG. 4. As stated above, if the channel is currently displaying an advertisement or other secondary information, the information displayed in the thumbnail view is not of the advertisement; rather, an image corresponding to the primary content of the channel is shown. The images in the thumbnails are periodically refreshed or updated such that thumbnails in the tiles in the prominent display positions are more frequently updated and those at less prominently displayed positions are less frequently updated. See step 50 in FIG. 4.

The user of the electronic channel guide discussed above may be provided with the ability to customize certain aspects of the user interface display, such as during a set up operation. For example, the user may be able to customize the size and/or number of tiles shown on the sphere, globe, or other object and/or change the object to a different shaped object. The user may also be able to adjust the shape or aspect ratio of the tiles, for example, to wide screen, standard width, or another aspect ratio. If the thumbnail images for the tiles do not match the size of the tiles, the images are automatically cropped or letterboxed.

In addition, the user interface display may enable the user to zoom "in" on part of the display, such as a part of a 3D sphere. For example, with respect to a 3D display, the sphere may be enlarged in 3D space such that only part of the sphere is shown. The user may zoom in so that their perspective is from the inside the sphere. The user interface display may also enable the user to zoom "out" on the display so that the entire sphere or object may be displayed and/or made smaller. In a relatively "far" zoom out view, various related content may be positioned into clusters of tiles on the surface of the sphere. For example, clusters of tiles may have smooth borders or may have jagged or irregular borders (such as continents or oceans on a globe). Clusters may be grouped, for example, by genre. For instance, the content can be grouped into categories such as sports, movies, soap operas, talk shows, and the like. Other exemplary criteria for clustering include clustering by time period, clustering by program (e.g., episodes of a particular series), and clustering by content provider (e.g., content from a particular source or network). When multiple such clusters are viewable in the zoom out mode, a title may appear in the display, e.g., superimposed on the cluster or floating over the cluster to identify the genre or other criterion for clustering.

Figure 5:
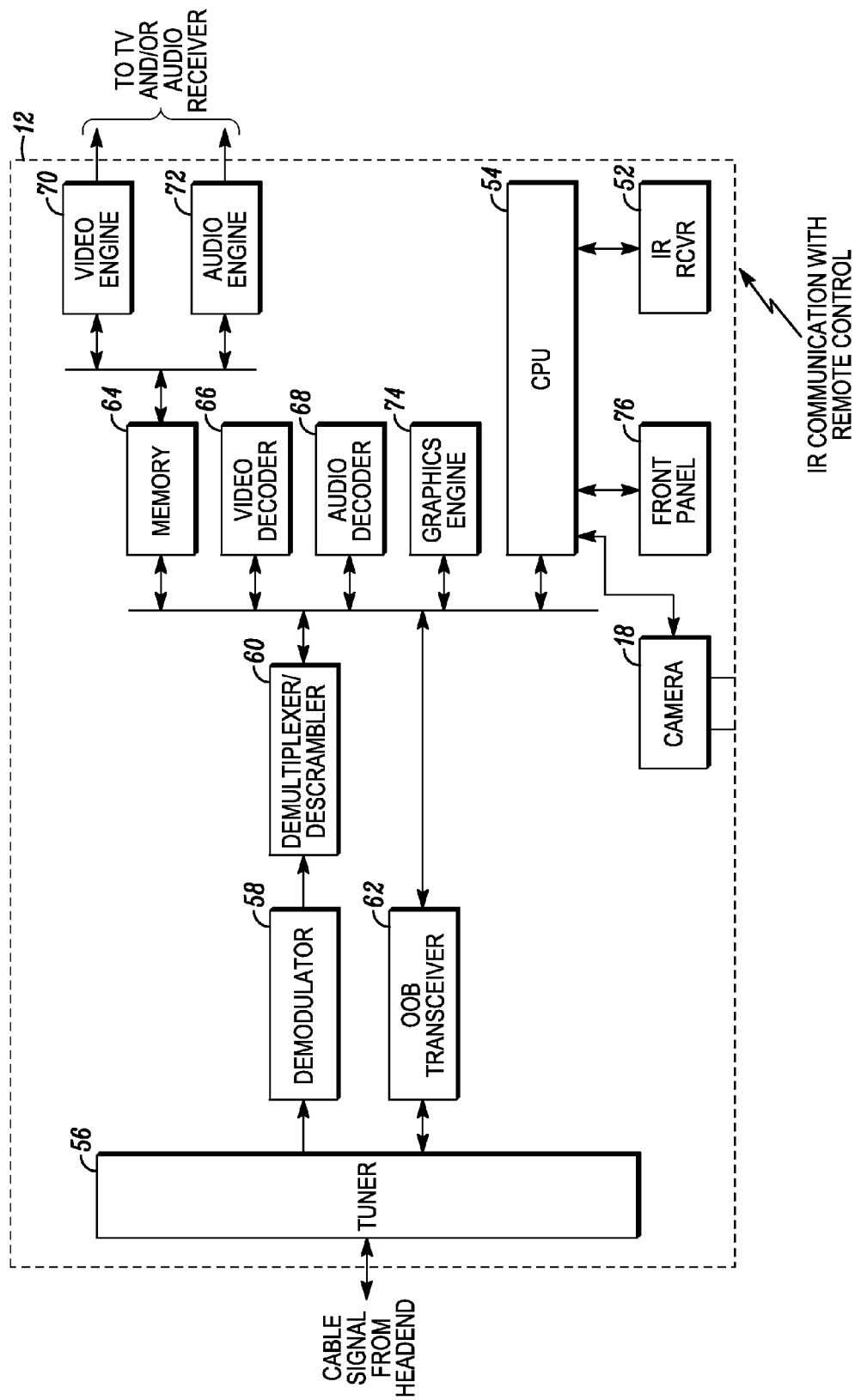
FIG. 5 is a schematic diagram of a signal processing electronic device, such as a set top box (STB), in accordance with an embodiment.
Figure 6:
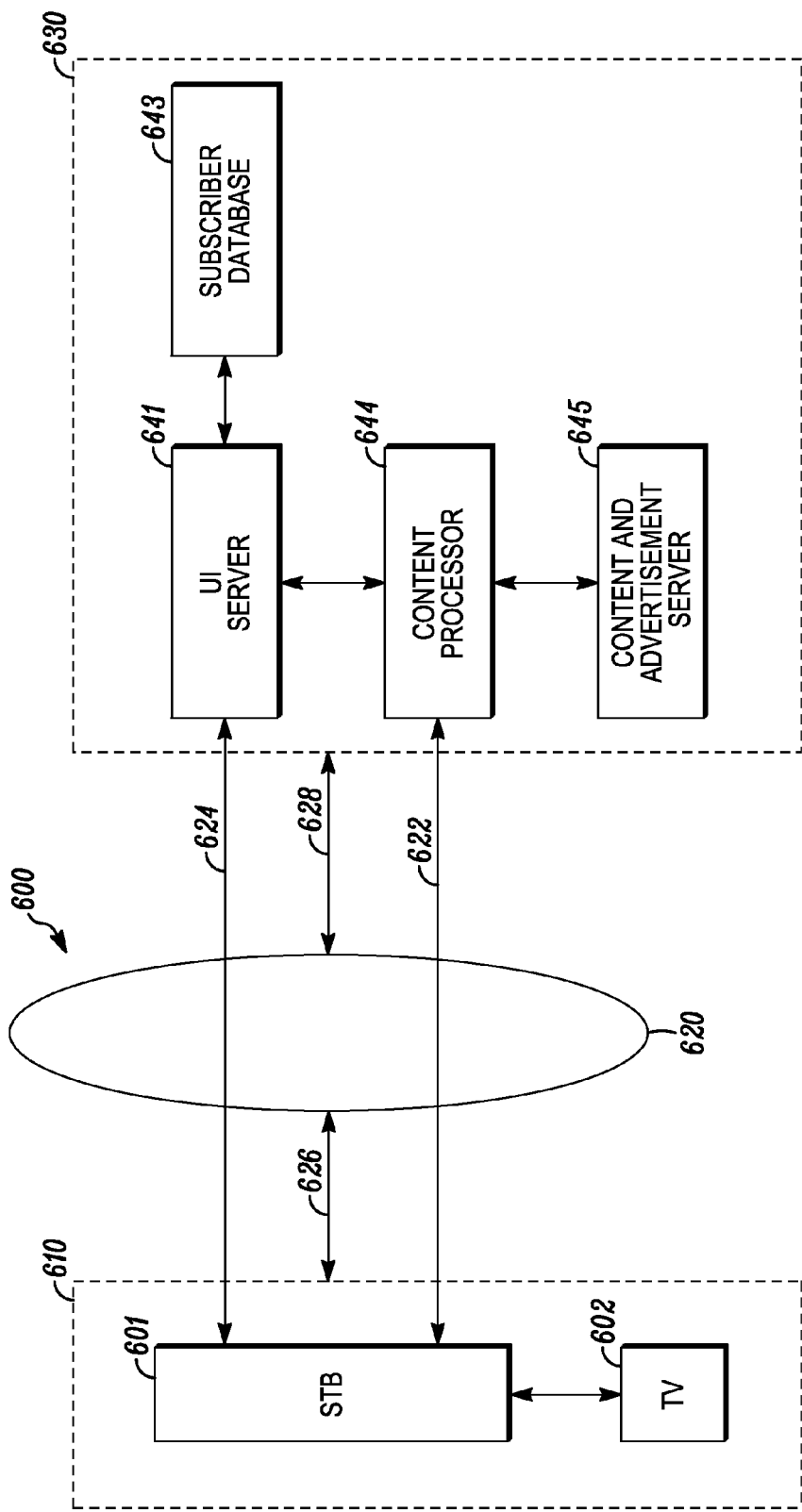
FIG. 6 is a schematic diagram of an exemplary system architecture for providing an interactive user interface display in a signal processing electronic device, in accordance with an embodiment.

Exemplary architectures for signal processing electronic devices that may be used in controlling a channel guide are illustrated in FIGS. 5 and 6. The exemplary signal processing electronic devices described herein include a set top box 12 (see FIG. 5) and a server on a network or cloud (see FIG. 6). Thus, the signal processing electronic devices responsible for populating the tiles of the user interface display may be a set top box or form part of a set top box or may be a device connected to a network or on a cloud and shared among many users or subscribers. By way of example, the signal processing electronic device on the cloud may create HTML pages for rendering on a monitor by the set top box.

The exemplary set top box 12 of FIG. 5 may include a cable system interface comprising a tuner 56 for selection of a particular signal originating from a cable system head end, a demodulator 58 for demodulating the signal into binary data, a demultiplexer 60 for separating the resulting binary data stream into constituent parts (e.g., MPEG encoded video, AC3 encoded audio, etc.), and an out of band transceiver 62 for transfer of control information, software updates, program guide data, and the like.

The operation of these components is under the control of a processor, such as CPU 54, responsive to an operating program resident in memory 64. Also under the control of the CPU 54 and the operating program, received media data is decoded by video and audio decoders, 66 and 68, and provided to video and audio output engines 70 and 72 for rendering on, for example, television 14. Additionally, a graphics engine 74 enables the processor and operating program to display locally-sourced information, e.g., guide data, set up menus, status messages or the like. For user interface purposes, a front control panel 76 and a remote control communication link receiver 52 are provided. A camera 18, as discussed above, may also be provided for purposes of identifying the viewers. The STB device 12 may also contain a connection between the CPU 54 and the internet which may be wired or wireless (not shown).

The memory 64 of the set top box 12 may store software instructions for controlling the functions of the set top box 12 (i.e. an operating program), application programs (e.g., electronic program guides, games, device setup applications, help menus, etc.) which may be permanently retained in the memory or may be transient, e.g., temporarily provisioned via out of band transceiver 62, etc., data for use in such operations (e.g., channel-line up, program guide information, graphic feedback images, etc.), user preference information and settings, and display templates and graphics for menus or messages. Additionally, portions of set top box memory 64 may serve as buffers for incoming and outgoing media data streams as they are decoded, processed and output to connected devices.

Software loaded and running in the CPU 54 or another processing unit may be configured to determine an identity of a user of the interactive user interface (such as via information from camera 18) and to sort a plurality of items of information to be displayed between items of information (i.e., channels, stored content, and the like) of greater interest to the user and items of information of lesser interest to the user. This information may be stored and retrieved from memory 64. The graphics engine 74 can be configured to format the interactive user interface in a form of a visual display of a three dimensional object having an outer surface contour defined by a series of tiles which include prominently displayed tiles and less prominently displayed tiles and in which the prominently displayed tiles are larger and less distorted than the less prominently displayed tiles. The graphics engine 74 via communications with the CPU 54 and/or memory 64 can also be configured to arrange the series of tiles in an initial visual display such that the items of information of greatest interest are automatically populated into the prominently displayed tiles and items of information of less interest are automatically populated in the less prominently displayed tiles.

Although a set top box 12 is discussed above with respect to FIG. 5, the signal processing electronic device may be any signal processing electronic device including a local server, a remote server, a media player, a digital video recorder, a television, a personal computer, a notebook or laptop computer, a tablet computer, a gaming console, a mobile device such as a smart phone, a remote control unit, and the like.

FIG. 6 is a schematic diagram of an exemplary system architecture for providing an interactive user interface display in a signal processing electronic device in accordance with an embodiment utilizing a remote server. A system 600 shown in FIG. 6 includes a user premises (local) portion 610 which resides on the user's premises and a non-premises (remote) portion 630. The portion 610 includes a set top box 601 connected to a display device 602. The set top box 601 is configured to determine which user or group of users is presently consuming content from the display 602. The portion 630 of the system 600 is located at a second facility other then the users' premises. The portion 630 includes a subscriber database 643 that may include data on which content the user is permitted access, subscription data, as well as preference information collected about the user or users. The subscriber database 643 may also include history information of content consumed by the user.

The remote portion 630 also includes a User Interface (UI) server 641 which interfaces with the set top box 601 to process user interface requests with the set top box 601. A content processor 644 in communication with the UI server 641 aggregates content and sends the content to the set top box 601. A server 645 in portion 630 has content and advertisement which are made available to content processor 644.

The local portion 610 of the system 600 is connected to the remote portion 630 using one or several network connections. A network connection 624 may connect the UI server 641 to the set top box 601 and carry user interface interactions, and the connection 622 may connect the content processor 644 to the set top box 601 and may carry the actual content to be viewed. The network connections 624 and 622 may include portions in the cloud 620 which may include the Internet. The set top box 601 may also include a connection 626 to the cloud, and the off premises equipment 630 may also include a connection 628 to the cloud. Those skilled in the art will realize that content and user interface interactions may be transferred over the cloud connections 626 and 628 as well as over connections 624 and 622.

The set top box 601 discovers the identity of the user or users consuming content from the display 602. This may be accomplished via a camera with facial recognition in the set top box, by the user(s) registering, or by other means as previously discussed. The set top box 601 communicates the user identity to the UI server 641 over connection 624. The UI Server 641 evaluates data related to the user from subscriber database 643, and determines a priority of content the user would be interested in consuming The UI server 641 also determines advertisements to present to the user based on information in the database 643. The prioritized list of content, an electronic channel guide, and advertisements is communicated to the set top box 601 via connection 624.

By way of example, the set top box 601 may identify that a specific user, e.g., John Smith, is watching his TV and communicates to server 641 that John Smith is watching TV. Server 641 checks database 643 for information on John Smith and learns that he has watched a particular football team, e.g., the Green Bay Packers, play football. The server would increase the prioritization on any content related to the Green Bay Packers and communicate the prioritization to the set top box 601. The server 641 functions to direct content server 644 to send chosen content and advertisements to the set top box over connection 622.

A further example illustrates a multiple user environment where both John and Jane Smith are identified as consuming content on the entertainment system. Again, this may be performed by facial recognition, specific login to the device, through NFC communication to a device on each user, or through other means known in the art. The UI server 641 checks database 643 for information on both John and Jane Smith, prioritizing content for each user in the method shown above. However, one difference in the procedures may be implemented where the content focused to each user is also delivered through the entertainment system to the location closest to each user. If, for example, Jane Smith has watched the Chicago Bears play football, the content specific to that preference can be delivered to the physical area of the device that is closest to (or within the best viewing/consumption position for) her position. Using the above example, content specific to the Green Bay Packers may be delivered through similar means to the physical position on the entertainment device that corresponds to John's position. The users' positions can be determined through various means, including image analysis, NFC detection for sensors carried by the user, or other means known in the art.

Further extending this example, the UI server 641 may check database 643 for information on the preferences shown when both John and Jane Smith consume content together, which may be a completely unique set of data. Preferences determined for the set of users may be used to drive the generation of a user interface display in the same manner as those shown in the first example.

Those skilled in the art will realize that the system architecture may be modified so that the functions of the UI server 641 and subscriber database 643 could exist partially or totally within the set top box 601. The set top box itself could track the user preferences and keep a database of user interests. While the servers and other equipment 641, 643, 644, and 645 are shown as separate entities, the functions may be combined into fewer or greater number of physical entities.

The above referenced signal processing electronic devices for carrying out the above method can physically be provided on a circuit board or within another electronic device and can include various processors, microprocessors, controllers, chips, disk drives, and the like. It will be apparent to one of ordinary skill in the art that the modules, processors, controllers, units, and the like may be implemented as electronic components, software, hardware or a combination of hardware and software. As stated above, contemplated embodiments are in the form of a set-top box with or without the use of remote servers providing an electronic channel guide as the interactive user interface display discussed above. Of course, the method is not limited to set-top boxes, remote servers or electronic channel guides.

While the principles of the invention have been described above in connection with specific devices, apparatus, systems, and methods, it is to be clearly understood that this description is made only by way of example and not as limitation on the scope of the invention as defined in the appended claims.

We claim:

1. A computer-implemented method, comprising:
   determining an identity of each user of a group of users of an interactive user interface; and
   populating a series of tiles with a signal processing electronic device using preference information associated with the group of users as a whole, the series of tiles forming the interactive user interface being in a form of an object having a surface contour;
   wherein said populating is performed such that content information of greater priority to the group of users as a whole is initially populated in tiles that are most prominently displayed on the object and content information of lesser priority to the group of users as a whole is initially populated in tiles that are less prominently displayed on the object.

2. The method according to claim 1, wherein the tiles that are most prominently displayed on the object are larger and less distorted than the tiles that are less prominently displayed on the object.

3. The method according to claim 1, wherein the object is a sphere having an equator and opposite poles, wherein the series of tiles are arranged in a plurality of rows, wherein, during said populating, the content information of greater priority is populated in tiles arranged in a row positioned on or adjacent the equator of the sphere, and wherein, during said populating, the content information of lesser priority is populated in tiles arranged in a row spaced from the equator of the sphere.

4. The method according to claim 1, wherein said determining the identity of each user is performed by at least one of automatically recognizing the user with an imaging device, automatically recognizing the user with a motion sensing device, automatically recognizing the user with a 3D mapping imaging device, receiving a manual input from the user, receiving a communication from a portable electronic device of the user, and detecting a near field communication device of the user.

5. The according to claim 1, wherein the interactive user interface is selected from a group comprising an interface to an electronic channel guide and an interface to an electronic program guide of a service provider of video content.

6. The method according to claim 1, wherein said populating the series of tiles with content information includes providing thumbnail images for display in the series of tiles, the thumbnail images are images selected from a group consisting of video, still images, 3D video, and 3D still images.

7. The method according to claim 6, wherein the interactive user interface is an interface to an electronic channel guide, wherein the content information includes channels provided by a service provider and content provided on the channels, and wherein the method further comprises:
   sampling the content on the channels to obtain sampled content for the channels; and
   displaying the sampled content as the thumbnail images on the tiles.

8. The method according to claim 7, wherein said sampling is performed periodically to periodically refresh the thumbnail images displayed by the tiles, and wherein the thumbnail images displayed in the tiles that are most prominently displayed are refreshed more frequently than the thumbnail images displayed in the tiles that are less prominently displayed.

9. The method according to claim 1, wherein the content information includes digital video recorded content, and wherein at least one of the series of tiles displays a thumbnail image corresponding to the digital video recorded content.

10. The method according to claim 1, wherein the content information includes one or more advertisements, and wherein at least one of the series of tiles displays a thumbnail image corresponding to an advertisement selected from the one or more advertisements.

11. The method according to claim 1, further comprising displaying the object in 3D on a three-dimensional display screen.

12. A method of populating an interactive user interface of an electronic channel guide, comprising:
   determining an identity of each user of a group of users consuming video content from a display;
   formatting the interactive user interface in a form of a surface in three dimensions, the surface having an outer surface contour defined by a series of tiles, the series of tiles including prominently displayed tiles and less prominently displayed tiles in which the prominently displayed tiles are larger and less distorted than the less prominently displayed tiles;
   sorting, using preference information associated with the group as a whole, a plurality of channels to be displayed on the series of tiles from channels of greater interest to the group of users to channels of lesser interest to the group of users; and
   populating the series of tiles such that the channels of greater interest to the group as a whole are automatically populated into the prominently displayed tiles and the channels of lesser interest to the group as a whole are automatically populated in the less prominently displayed tiles.

13. The method according to claim 12, wherein the surface is a sphere having an equator and opposite poles, and the series of tiles are arranged in a plurality of rows;
   wherein, during said populating, the channels of greater interest to the group as a whole are populated in tiles arranged in a row positioned on or adjacent the equator, and
   wherein, during said populating, the channels of lesser interest to the group as a whole are populated in tiles arranged in a row spaced from the equator of the sphere.

14. The method according to claim 13, further comprising displaying the sphere in 3D on a three-dimensional display.

15. The method according to claim 12, wherein said determining the identity of each user of a group of users is performed by at least one of automatically recognizing the user with an imaging device, automatically recognizing the user with a motion sensing device, automatically recognizing the user with a 3D mapping imaging device, receiving a manual input from the user, receiving a communication from a portable electronic device of the user, or detecting a near field communication device of the user.

16. The method according to claim 12, wherein said populating the series of tiles with information includes providing thumbnail images for display in the series of tiles, wherein the thumbnail images are images selected from a group consisting of video, still images, 3D video, and 3D still images, and wherein the method further comprises:
   sampling content on one or more of the plurality of channels to obtain sampled content for the one or more of the plurality of channels; and
   displaying at least a portion of the sampled content as the thumbnail images on one of the tiles.

17. The method according to claim 16, wherein said sampling is performed periodically to periodically refresh the thumbnail images displayed by the tiles, and wherein the thumbnail images displayed in the tiles that are most prominently displayed are refreshed more frequently than the thumbnail images displayed in the tiles that are less prominently displayed.

18. The method according to claim 17, wherein existing thumbnail images are from a previous sample, and when the periodically refreshed and sampled images are advertisements, then the previous sample is displayed in the thumbnail image.

19. The method according to claim 12, wherein said populating the series of tiles includes populating digital video recorded content and an advertisement in tiles, and wherein at least one of the series of tiles displays a thumbnail image corresponding to the digital video recorded content and at least one of the series of tiles displays a thumbnail image corresponding to the advertisement.

20. A signal processing electronic device for populating a display of an interactive user interface with information, comprising:
   at least one processing unit to format the interactive user interface in a form of a visual display of a three dimensional object having an outer surface contour defined by a series of tiles, the series of tiles including prominently displayed tiles and less prominently displayed tiles in which the prominently displayed tiles are larger and less distorted than the less prominently displayed tiles;
   said at least one processing unit to sort, based on preference information of an identified group of users as a whole, a plurality of items of content information to be displayed by distinguishing between items of content information of greater interest to the identified group of users as a whole and items of content information of lesser interest to the identified group of users as a whole; and
   said at least one processing unit to arrange the series of tiles in an initial visual display such that the items of content information of greater interest to the group of users as a whole are automatically populated into the prominently displayed tiles and the items of content information of lesser interest to the group of users as a whole are automatically populated in the less prominently displayed tiles.

21. The signal processing electronic device according to claim 20, wherein the signal processing electronic device is selected from a group consisting of a set-top box, a server, a media player, a digital video recorder, a television, a personal computer, a lap-top computer, a tablet computer, a gaming console, a smart phone, and a remote controller, and wherein the items of information include video content.

22. The signal processing electronic device according to claim 20, wherein the interactive user interface is an interface to an electronic channel guide, and wherein the items of information include video content provided by a plurality of channels received from a service provider.

23. The signal processing electronic device according to claim 20, wherein said at least one processing unit is configured to determine an identity of each user of a group of users consuming video content from a display, and wherein said signal processing electronic device includes at least one of an imaging device, a camera, a motion sensing device, a 3D mapping imaging device, a communication device, and a near field communication sensor for identifying each user of the group of users.

24. A non-transitory computer readable storage medium having computer program instructions stored thereon that, when executed by at least one processor, cause the at least one processor to perform the following operations:
- determining an identity of each user of a group of users of an interactive user interface;
- populating a series of tiles of an interactive user interface based on preference information associated with the group of users as a whole, the series of tiles forming the interactive user interface being in a form of a visual display of a representation of an object having an outer surface contour defined by the series of tiles;
- wherein said populating is performed such that content information of greater priority to the group of users as a whole is initially populated in tiles that are most prominently displayed on the object and content information of lesser priority to the group of users as a whole is initially populated in tiles that are less prominently displayed on the object.

* * * * *